United States Patent
Conley

(10) Patent No.: US 6,212,958 B1
(45) Date of Patent: Apr. 10, 2001

(54) FLOW SENSING ASSEMBLY AND METHOD

(75) Inventor: Paul G. Conley, St. Charles, MO (US)

(73) Assignee: Lincoln Industrial Corporation, St. Louis, MO (US)

( * ) Notice: Subject to any disclaimer, the term of this patent is extended or adjusted under 35 U.S.C. 154(b) by 0 days.

(21) Appl. No.: 09/116,281

(22) Filed: Jul. 16, 1998

(51) Int. Cl.[7] ................................... G01F 1/28
(52) U.S. Cl. ............................. 73/861.74; 73/861.71
(58) Field of Search ..................... 73/861.74, 861.75, 73/861.76, 861.77, 861.71

(56) References Cited

U.S. PATENT DOCUMENTS

| | | | |
|---|---|---|---|
| 2,826,914 | * 3/1958 | Reiley ........................ | 73/861.74 |
| 2,943,486 | 7/1960 | Osgood ...................... | 73/228 |
| 3,354,716 | 11/1967 | Wiebe et al. ............... | 73/198 |
| 3,381,776 | 5/1968 | Gruber et al. .............. | 184/6 |
| 3,424,000 | 1/1969 | Chelner et al. ............. | 73/228 |
| 3,730,297 | 5/1973 | Colgan et al. .............. | 184/6.4 |
| 3,857,277 | * 12/1974 | Moore ....................... | 73/861.74 |
| 4,143,255 | 3/1979 | Herscovitz ................. | 200/81.9 M |
| 4,167,172 | 9/1979 | Bassoli et al. ............. | 123/196 S |
| 4,282,413 | 8/1981 | Simons et al. ............. | 200/81.9 M |
| 4,311,980 | 1/1982 | Prudenziati ................ | 338/4 |
| 4,864,271 | 9/1989 | Yajima ....................... | 338/4 |
| 4,894,635 | 1/1990 | Yajima et al. .............. | 338/2 |
| 5,038,893 | 8/1991 | Willner et al. ............. | 184/7.4 |
| 5,060,761 | 10/1991 | Arndt et al. ............... | 184/6.14 |
| 5,125,480 | 6/1992 | Gregory et al. ............ | 184/6.26 |
| 5,253,651 | * 10/1993 | Stockwell et al. .......... | 73/861.74 |
| 5,663,508 | * 9/1997 | Sparks ....................... | 73/861.74 |

\* cited by examiner

*Primary Examiner*—Harshad Patel
(74) *Attorney, Agent, or Firm*—Senniger, Powers, Leavitt & Roedel

(57) ABSTRACT

A flow sensing assembly for detecting the presence of fluid flow includes a sensor body having a flow passage therethrough and a resilient blade having an end which is fixed relative to the sensor body and an end which is freely movable. The blade extends into and across the flow passage so that fluid flowing through the passage causes the free end of the blade to deflect in a downstream direction from a no-flow position to a flow position, and the free end of the blade returns to its no-flow position upon stoppage of flow. The flow sensing assembly also includes a detection device for detecting deflection of the blade and for producing a signal indicating the occurrence of fluid flow. A method of detecting the flow of fluid through a flow passage involves mounting a blade in the sensor body such that the blade extends into and across the flow passage whereby fluid flowing through the flow passage causes the free end of the blade to deflect in a downstream direction. The method also involves intermittently pumping fluid through the flow passage, detecting deflection of the blade due to flow of fluid through the flow passage, and generating a signal indicating the occurrence of fluid flow in response to deflection of the blade.

8 Claims, 3 Drawing Sheets

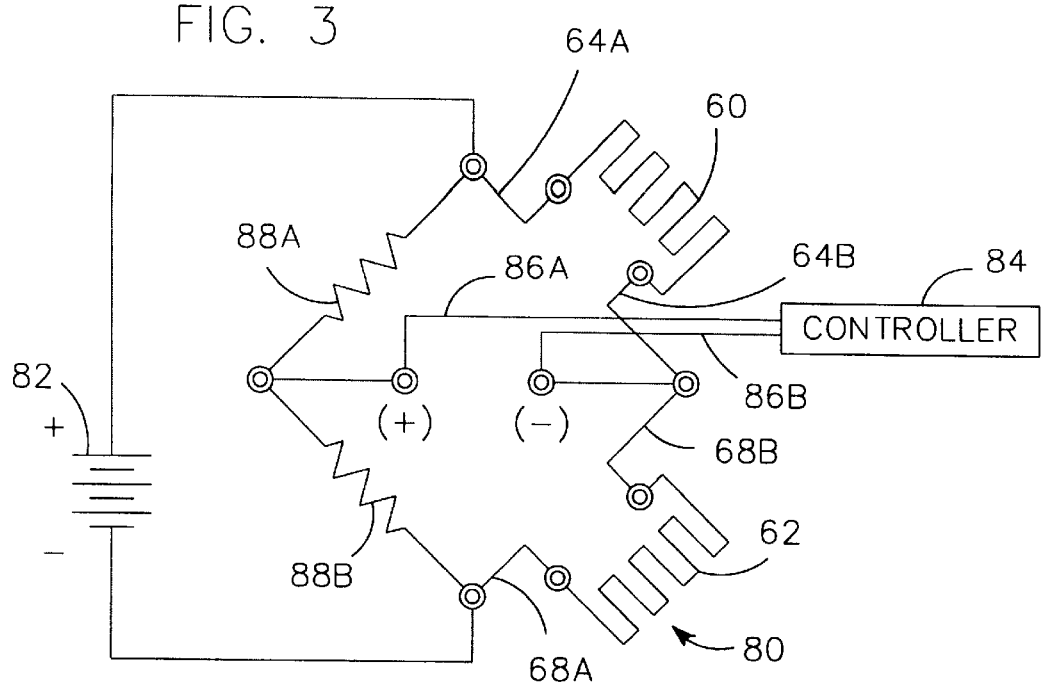
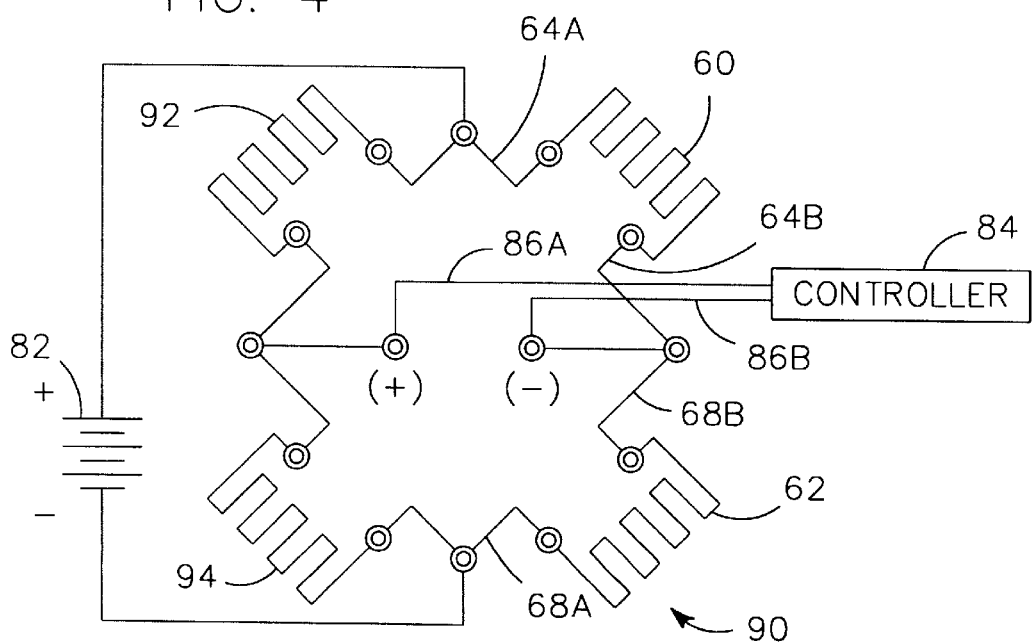

FLOW SENSING ASSEMBLY AND METHOD

BACKGROUND OF THE INVENTION

The present invention relates generally to a flow sensing assembly and method for detecting the flow of fluid through a flow passage and, more particularly, to a flow sensing assembly and method for detecting the presence of fluid flow in low flow applications.

This invention has particular (albeit not exclusive) application to the lubrication of bearings. There are a variety of systems on the market which are used for delivering lubricant to bearings. In many cases it is desirable to monitor whether lubrication is accomplished in a timely manner, especially with respect to critical bearings which might otherwise fail. Monitoring can be carried out by manual examination of the bearing or by a system which automatically detects flow of lubricant to the bearing. However, where the quantities of lubricant delivered to the bearing are small, reliable detection is difficult to achieve. This is due at least in part to the unavailability of an effective yet inexpensive sensor which is capable of detecting the flow of even small quantities of material through a flow line.

Reference may be made to U.S. Pat. Nos. 2,943,486 and 4,143,255 disclosing various devices in the field of this invention. U.S. Pat. No. 2,943,486 describes a flow sensor which is designed to extend into a flow passage and obstruct the path of fluid flow so that the flow rate of the fluid may be determined. While able to detect the presence of fluid flow under high flow conditions, such sensors typically do not extend across the entire flow passage and thus do not effectively detect the presence of fluid flow in low flow applications. Consequently, the use of these sensors in a lubrication line would likely result in excessive lubrication, increased expense and reduced performance.

U.S. Pat. No. 4,143,255 discloses a flow sensor having a spring-biased paddle which extends into and across the flow path during static or "no-flow" conditions. The flow of fluid causes the paddle to align itself parallel with the fluid flow during "flow" conditions, and an associated switch or magnet determines whether the paddle is in the "no-flow" or "flow" position. However, these sensors do not effectively detect the presence of fluid flow in low flow applications. As an example, low flow may fail to pivot the paddle into the "flow" position because of the force of the spring in addition to the static fluid pressure on the downstream side of the paddle. Moreover, once the paddle is in the "flow" position, the upstream static fluid pressure may prevent the paddle from returning to its "no-flow" position. This is especially true in applications involving highly viscous materials such as a lubricant. Sensors which use a magnet to signal movement between the no-flow and flow positions suffer from the further drawback that a nonmagnetic material must be used so that the sensor will not interfere with the magnetic field.

SUMMARY OF THE INVENTION

Among the several objects and features of the present invention may be noted the provision of a flow sensor assembly and method capable of detecting the presence of fluid flow under low flow conditions; to provide such an assembly and method capable of detecting the presence of fluid flow where there is a static head of fluid in the flow passage; to provide such an assembly and method capable of detecting the presence of flow in highly viscous fluids; to provide such an assembly which may be conveniently installed in a fluid flow line such as a lubrication line; to provide such an assembly and method capable of extending the life of a critical bearing by reliably detecting the flow of lubricant to the bearing; and to provide such an assembly and method which is simple in construction for economic manufacture.

Briefly, the flow sensing assembly of the present invention comprises a sensor body having a flow passage therethrough, and a resilient blade having an end which is fixed relative to the sensor body and an end which is freely movable. The blade extends as a cantilever from its fixed end to its free end into and across the flow passage generally broadside with respect to the direction of flow so that fluid flowing through the flow passage causes the free end of the blade to deflect in a downstream direction from a no-flow position to a flow position. The free end of the blade returns to its no-flow position upon stoppage of flow. The assembly also includes a detecting device for detecting deflection of the blade due to flow of fluid through the flow passage and for producing a signal indicating the occurrence of fluid flow.

This invention is also directed to a method of detecting the flow of fluid through a flow passage in a sensor body. The method comprises the step of mounting a blade so that it extends into and across the flow passage from an end of the blade which is fixed relative to the body to an end of the blade which is freely movable so that fluid flowing through the flow passage causes the free end of the blade to deflect in a downstream direction. The method also includes the steps of intermittently pumping fluid through the flow passage, detecting deflection of the blade due to flow of fluid through the flow passage, and generating a signal indicating the occurrence of fluid flow in response to deflection of the blade.

Other objects and features of the present invention will be in part apparent and in part pointed out hereinafter.

BRIEF DESCRIPTION OF THE DRAWINGS

FIG. 3 is a schematic representation of a half bridge circuit for the flow sensing assembly and other electrical components; and FIG. 4 is a schematic representation of a full bridge circuit for the flow sensing assembly and other electrical components.

Corresponding reference characters indicate corresponding parts throughout the several views of the drawings.

DETAILED DESCRIPTION OF THE PREFERRED EMBODIMENT

Figure 1:
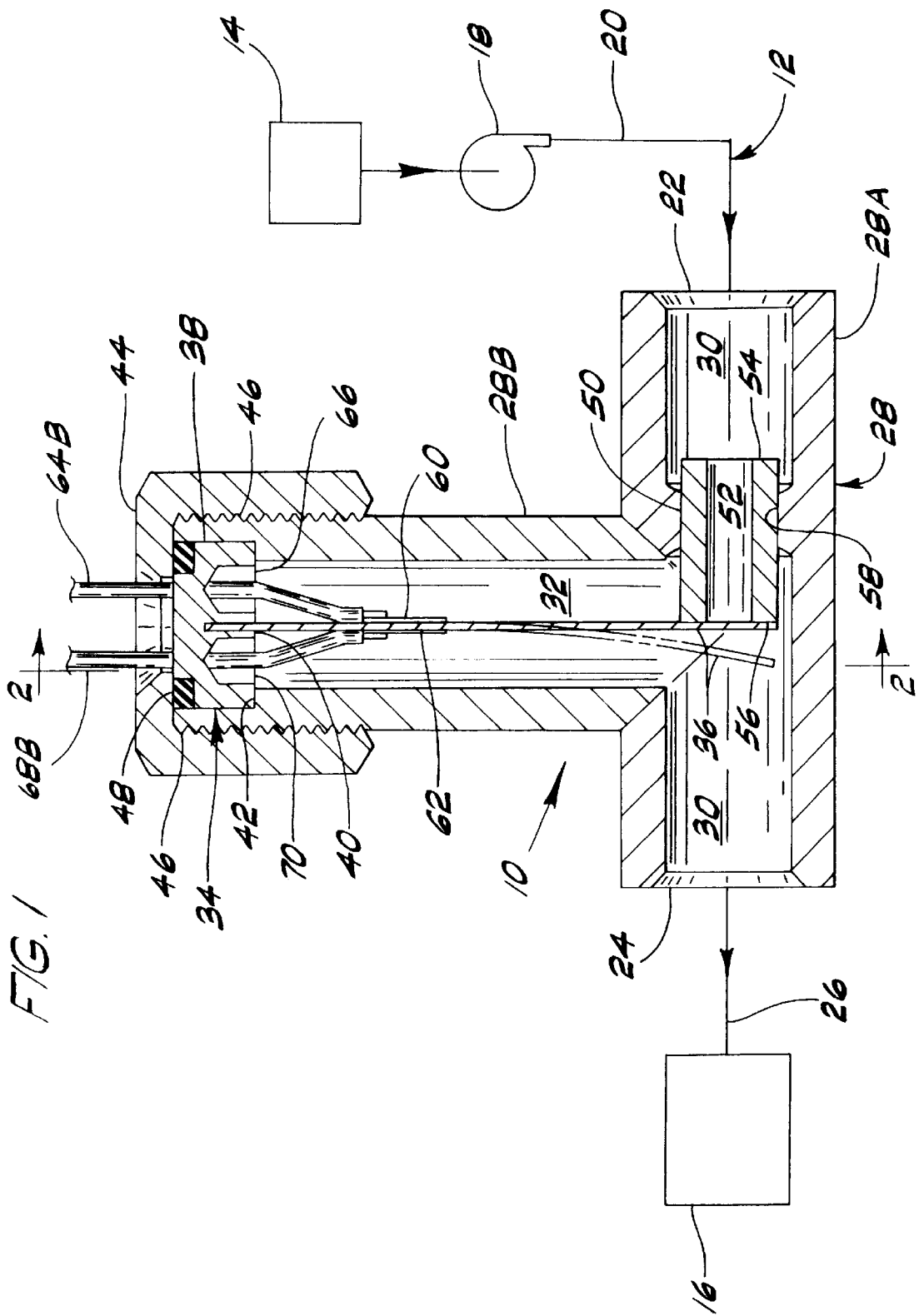
FIG. 1 is a sectional side elevational view of a flow sensing assembly of the present invention installed in a lubrication line, the latter being shown schematically.

Referring now to the drawings and first to FIG. 1, a flow sensing assembly of the present invention is designated generally by reference numeral 10. Assembly 10 is shown in a lubrication line 12 which extends from a lubricant supply 14 to a bearing 16. While supply 14 may provide lubricant to more than one bearing, only one bearing 16 is shown for ease of illustration. A pump 18 associated with supply 14 pumps lubricant into a conduit 20, which carries the lubricant downstream towards bearing 16. Conduit 20 terminates at an inlet 22 of the sensor assembly 10, which is disposed upstream from bearing 16 at a location relatively close to the bearing. The sensor 10 has an outlet 24 connected to the bearing 16 either directly or by a short downstream conduit 26 (as shown in FIG. 1).

Assembly 10 comprises a T-shaped sensor body 28 having a first tube 28A which defines a flow passage 30 extending from inlet 22 to outlet 24. A second tube 28B projects laterally outwardly from the first tube 28A at a point intermediate inlet 22 and outlet 24. Tube 28B defines a chamber 32 which is in fluid communication with the flow passage 30.

As shown in FIG. 1, a means generally designated 34 is provided at the outer (upper) end of the second tube 28B for mounting a resilient blade 36 within chamber 32 so that the blade extends as a cantilever into and across flow passage 30 generally broadside with respect to the direction of flow.

Mounting means 34 includes a blade retainer 38 having a recess 40 for fixedly receiving one end of the deflector blade 36. The blade is preferably secured within recess 40 by an adhesive such as Loctite RC609. The underside of retainer 38 rests on an inner annular shoulder 42 formed near the outer end of tube 28B. A cap 44 having internal threads is threadably engageable with a set of external threads 46 on the tube 28B so that cap 44 exerts downward pressure on the retainer 38 and holds the retainer in a fixed position relative to tube 28B. An O-ring 48 provides a seal between cap 44 and retainer 38.

The assembly 10 further includes a means 50 for defining an orifice 52 of reduced diameter in the flow passage 30. Means 50 has an inlet end 54 for entry of fluid into the orifice and an outlet end 56 for exit of fluid from the orifice. The outlet end 56 of means 50 is configured to provide a flat smooth seat which is engageable by the upstream side (face) of blade 36. As shown in FIG. 1, means 50 preferably comprises a tubular insert which is separate from the sensor body 28 and press fit into an opening defined by an annular shoulder 58 in the flow passage 30 so as to be coaxially mounted therein. An advantage of this construction is that a flat seat can be machined on the insert 50 before being installed in the tube 28A, thereby avoiding the more difficult task of forming means 50 integrally with the tube 28A.

Figure 2:
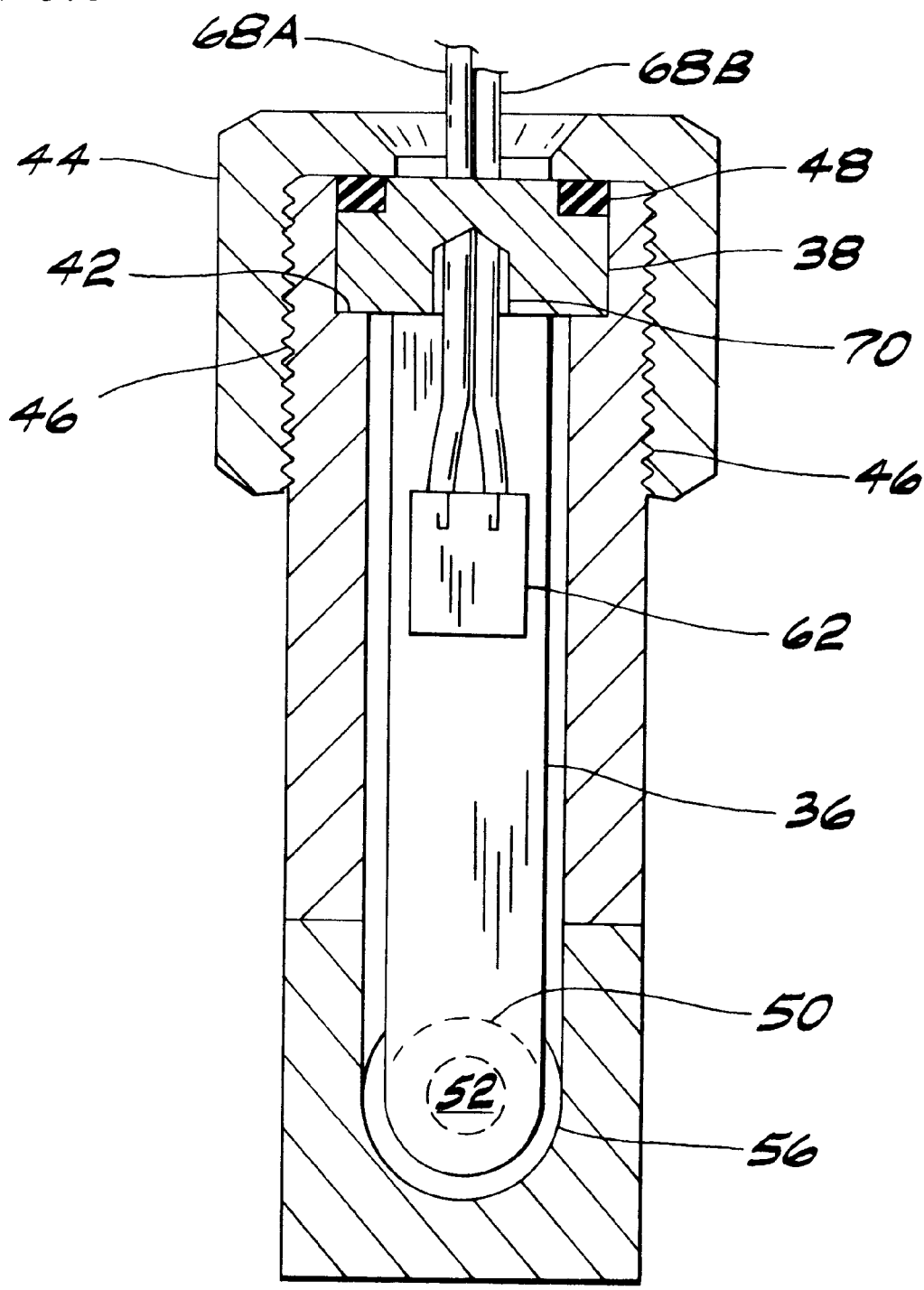
FIG. 2 is a sectional view of the flow sensing assembly taken along line 2—2 of FIG. 1.

Referring now to FIGS. 1 and 2, the deflector blade 36 is dimensioned to have a width at least as great as the diameter of the orifice 52 so that the upstream side or face of the blade 36 completely covers the orifice 52 when the blade rests against seat 56. It is presently preferred that the blade 36 is made of hardened stainless steel, and that the thickness of the blade is between about 0.015 and 0.023 inches and preferably about 0.020 inches.

The upper end of the blade 36 is fixed within the retainer 38 such that the opposite (lower) end of the blade will extend into the flow passage 30 and contact the outlet end 56 of the insert 50 when there is no fluid flow. In this no-flow position, blade 36 is disposed substantially perpendicular to the path of fluid flow. When fluid flows through the orifice 52, the free end of blade 36 resiliently deflects in a downstream direction from its no-flow position to a flow position (shown in phantom lines in FIG. 1). Upon stoppage of flow, the blade 36 returns to its no-flow position in which it substantially sealingly engages seat 56 so that even a small quantity of fluid flowing past the seat will cause the blade 36 to deflect to a flow position.

A pair of strain gauges 60, 62 are mounted on opposite faces of the blade 36. Strain gauge 60 is coupled to the upstream face of the blade to measure tension of the blade, and strain gauge 62 is coupled to the downstream face of the blade to measure compression of the blade. Electrical leads 64A (FIGS. 3 and 4), 64B are connected to the upstream strain gauge 60 and extend out of the body 28 through a channel 66 formed in retainer 38 and through a corresponding hole in cap 44. Similarly, leads 68A, 68B are connected to the downstream strain gauge 62 and extend out of body 28 through a channel 70 formed in retainer 38 and through a corresponding hole in cap 44. Channels 66, 70 are filled with a potting compound such as epoxy or another hardenable resinous material to provide an airtight seal. The holes are also sealed to prevent grease from leaking out through cap 44.

With reference to FIG. 3, electrical leads 64A, 64B, 68A, 68B are connected in a conventional half bridge circuit 80, which is connected with a battery 82. The circuit 80 is also connected with a 16-bit processor controller 84 by a pair of output leads 86A, 86B. The controller 84 receives a voltage output signal from the circuit 80 via leads 86A, 86B and is adapted to record the voltage signal in a memory. If the bearing fails, the lubrication history of the bearing can be obtained from the memory of the controller 84. Moreover, the voltage signal can be correlated to an amount of deflection of the blade which provides an estimate of the volume of fluid flow. Thus, the output voltage can be mapped to flow.

The half bridge circuit 80 includes strain gauges 60, 62 and a pair of resistors 88A, 88B having resistance values selected to balance the bridge when deflector blade 36 is in its "no-flow" position. For example, strain gauges 60, 62 are preferably 1,000 ohm strain gauges, and the circuit 80 should be balanced where each resistor 88A, 88B has a value of approximately 1,000 ohms. The battery 82 and the resistors 88A, 88B are located inside the controller housing.

With the blade 36 in its "no-flow" position, there is substantially zero tension and compression of blade 36 and bridge circuit 80 is balanced. To improve accuracy, the controller 84 may calibrate the circuit 80 periodically by resetting the "no-flow" tension and compression value to zero (e.g., each time the system is turned on). When the blade 36 is deflected in a downstream direction, the bridge 80 becomes unbalanced because the strain gauges 60, 62 detect an increase in the tension and compression of blade 36 beyond a minimum threshold value. While a low threshold value is generally desirable, those skilled in the art will appreciate that the threshold setting must be high enough to be detected by the strain gauges and sufficient to produce a voltage output signal to the controller 84 which can be distinguished from typical outside electrical noise. Accordingly, it is presently preferred that the threshold setting is between about 0.0005 and 0.0010 inches per inch-strain measured at the location of the strain gauge, and that the value of the output signal is greater than about 25 millivolts.

Alternatively, as shown in FIG. 4, a full bridge circuit 90 may be used in lieu of half bridge circuit 80 by replacing resistors 88A, 88B with a second upstream strain gauge 92 and a second downstream strain gauge 94. Thus, full bridge circuit 90 includes four strain gauges 60, 62, 92 and 94, all of which are mounted on blade 36. Although the four strain gauge circuit 90 is more expensive than the two strain gauge circuit 80, the circuit 90 yields a higher voltage output signal and provides greater resolution.

As with the half bridge 80, the full bridge 90 is configured so that it is balanced when deflector blade 36 is in its "no-flow" position and unbalanced when the strain gauges detect a threshold change in the tension and compression of blade 36. To this end, the strain gauges 60, 62, 92, 94 are preferably 1,000 ohm strain gauges. The battery 82 of circuit 90 is located inside the controller housing.

In use, the flow sensing assembly 10 is mounted in a lubrication line 12 in close proximity to the bearing 16 to detect the occurrence of flow in passage 30 indicating delivery of lubricant to the bearing. A typical lubrication line 12 contains a static head of lubricant extending from supply 14 to bearing 16. Each time pump 18 discharges additional lubricant into the line, the lubricant in conduit 20 and flow passage 30 advances toward bearing 16.

When there is no flow of lubricant in passage 30, blade 36 remains in its no-flow position with its free end resting against the outlet end 56 of the tubular insert 50. As lubricant is pumped into conduit 20, even a low rate of flow through orifice 52 will deflect the free end of blade 36 in a downstream direction from the no-flow position to a flow position. A change in tension on the upstream face of the blade will be reflected in a corresponding change in the resistance value of strain gauge 60, and a change in compression on the downstream face of the blade will be reflected in a corresponding change in the resistance value of strain gauge 62. Thus, a change in the tension and compression of the blade 36 will cause bridge circuit 80 to become unbalanced, thereby generating an output signal indicating the occurrence of lubricant flow to bearing 16. The signal is output over leads 86A, 86B to the controller 84 which records the signal or otherwise indicates that bearing 16 has received lubricant.

The blade 36 will return to its no-flow position upon stoppage of flow through flow passage 30. Consequently, strain gauges 60, 62 will return to their original resistance values, and circuit 80 will once again be balanced. Therefore, generation of the output signal will be discontinued.

Similarly, with respect to full bridge circuit 90 in FIG. 4, a change in tension on the upstream face of the blade will be reflected in corresponding changes to the resistance values of strain gauges 60, 92, and a change in compression on the downstream face of the blade will be reflected in corresponding changes to the resistance values of strain gauges 62, 94. Thus, a change in the tension and compression of the blade 36 will cause circuit 90 to become unbalanced, thereby generating an output signal indicating the occurrence of lubricant flow to bearing 16. Since blade 36 will return to the no-flow position upon stoppage of flow through flow passage 30, strain gauges 60, 62, 92 and 94 will return to their original resistance values. Accordingly, the circuit 90 will once again be balanced, and generation of the output signal will be discontinued.

The present invention is adapted for detecting the presence of fluid flow under a variety of conditions. While the disclosed embodiment is discussed primarily with respect to a lubrication line, the invention is equally effective in detecting the presence of fluid flow for many other fluids. Moreover, the present invention can detect the occurrence of fluid flow with a static head of fluid in the flow passage, under low flow conditions and with highly viscous materials. Since the present invention does not use a magnet to signal movement between the "no-flow" and "flow" positions, the sensor of the present invention is not restricted to a nonmagnetic material.

The deflector blade 36 shown in FIGS. 1 and 2 can have many other shapes and can be mounted in different ways depending on the specific application. For example, the thickness of the blade may be adjusted for use with a particular fluid.

FIGS. 3 and 4 each represent only one of many different bridge circuits contemplated for accomplishing the objects of the present invention. Those skilled in the art will readily appreciate any number of modifications that could be made to the circuitry of FIGS. 3 and 4.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A flow sensing assembly for detecting the flow of a fluid, comprising a sensor body having a flow passage therethrough, a resilient blade having an end which is fixed relative to the sensor body and an end which is freely movable, said blade extending as a cantilever from its fixed end to its free end into and across the flow passage transverse with respect to the direction of flow whereby fluid flowing through the flow passage causes the free end of the blade to deflect in a downstream direction from a no-flow position to a flow position, said free end of the blade returning to its no-flow position upon stoppage of flow, means defining an orifice of reduced diameter in the flow passage, said means comprising a tubular insert coaxially mounted inside said flow passage and separate from the sensor body whereby the insert can be machined separate from the sensor body before being mounted in the flow passage, said means having an inlet end for entry of fluid into the orifice and an outlet end for exit of fluid from the orifice, said blade being engageable with said outlet end when the blade is in its said no-flow position, and a detecting device for detecting deflection of the blade due to flow of fluid through the flow passage and for producing a signal indicating the occurrence of said fluid flow, wherein said blade is dimensioned to have a width at least as great as the diameter of said orifice whereby the blade completely covers the orifice when the blade is in its said no-flow position, and said outlet end has a flat smooth seat substantially sealingly engageable by the blade when in its said no-flow position whereby even a small quantity of fluid flowing past the seat is adapted to deflect the blade to its flow position.

2. The flow sensing assembly of claim 1 wherein said sensor body comprises a first tube defining said flow passage, a second tube extending laterally outwardly from the first tube, and means mounting the blade in position in which the blade extends generally axially with respect to the second tube inside the second tube and projects into and across said flow passage.

3. The flow sensing assembly of claim 2 wherein said means mounting the blade comprises a blade retainer received in an outer end of the second tube, said blade retainer having a recess therein for fixedly receiving the fixed end of the blade, and a cap on the outer end of the second tube for holding the blade retainer in fixed position relative to the second tube.

4. The flow sensing assembly of claim 1 further comprising a controller electrically connected to the detecting device for receiving the signal indicating the occurrence of fluid flow.

5. The flow sensing assembly of claim 1 wherein said detecting device comprises a strain gauge connected to an upstream face of the blade for detecting tension in the blade, a downstream strain gauge connected to a downstream face of the blade for detecting compression in the blade, and a bridge circuit electrically connected to said strain gauges, said bridge circuit being balanced when the blade is in said no-flow position and being unbalanced when the blade is in said flow position whereby the flow of fluid through the flow passage moves the free end of the blade from said no-flow position to said flow position, places the upstream strain gauge in tension, places the downstream strain gauge in compression, and causes the bridge circuit to produce a signal indicating the occurrence of fluid flow.

6. The flow sensing assembly of claim 5 wherein the bridge circuit is a half bridge circuit.

7. The flow sensing assembly of claim 5 wherein the bridge circuit is a full bridge circuit.

8. The flow sensing assembly of claim 5 further comprising a battery connected to the bridge circuit.

* * * * *